Nov. 3, 1959     R. D. BOUTROS ET AL     2,911,240
SEALING MEANS FOR RECEPTACLE SHAFT OPENING
Original Filed April 8, 1954     7 Sheets-Sheet 1

INVENTORS
RICHARD D. BOUTROS
MILTON DYKMAN
BY
*Edward H. Dumpston*
HIS ATTORNEY.

Fig. 7

United States Patent Office
2,911,240
Patented Nov. 3, 1959

2,911,240

SEALING MEANS FOR RECEPTACLE SHAFT OPENING

Richard D. Boutros, Brighton, and Milton Dykman, Rochester, N.Y., assignors to Mixing Equipment Co., Inc., Rochester, N.Y., a corporation of New York Continuation of abandoned application Serial No. 421,732, April 8, 1954. This application August 30, 1956, Serial No. 607,195

19 Claims. (Cl. 286—11.13)

This invention relates to devices for sealing an opening for a shaft through the wall of a fluid-containing receptacle, such as the opening for a rotatable shaft, as for example, the drive shaft of an agitating or mixing device, one object of the present invention being to provide a sealing device of the above character having a more practical and efficient construction and mode of operation.

In the past, it has been common practice in sealing a shaft opening through the wall of a fluid-containing receptacle to use either a stuffing box having a series of packing rings therein and a gland for compressing said rings around the shaft, or to use a mechanical seal comprising a stationary ring fixed to a wall of the receptacle and having a highly finished surface and a second ring mounted on the shaft for rotation therewith and having a highly finished surface which was held in close-fitting, substantially fluid-tight engagement with the finished surface of the first ring.

However, neither of these sealing devices has been entirely satisfactory, for it is extremely difficult to get a perfect seal with the stuffing-box type of construction, for a certain amount of fluid will seep through the packing along the shaft. This not only presents a maintenance expense and problem, but if the fluid within the receptacle is inflammable, toxic, corrosive, or valuable, the loss through the stuffing box may be critical.

On the other hand, the mechanical seal is capable of providing a substantially fluid-tight seal, but it has the disadvantage in that the seal is consumable and is subject to fracture. When the shaft opening is below the fluid level and the mechanical seal fails, there is nothing to prevent rapid loss of the contents of the receptacle through the shaft opening and the only way to reduce the loss of the tank contents is to pump the tank out as quickly as possible. In the case, for example, of gasoline storage tanks holding from one to five million gallons of gasoline, the pumping out of the tank requires a considerable length of time and much gasoline will be lost during the pumping out operation. In many cases there may be no other place to pump 5,000,000 gallons of gasoline since no tanks are available. In addition, if the shaft referred to is part of a mixing or agitating apparatus, there is a further disadvantage in that when the mechanical seal fails, the mixing apparatus must be shut off and its use discontinued until the seal can be replaced. A further disadvantage is that as a mechanical seal cannot be made in two or more segments and assembled laterally over a shaft, but must be threaded over the end of the shaft, the above repairs to the mechanical seal cannot be made until the shaft can be laboriously removed from the receptacle. As pointed out above, by this time, excessive loss of the contents of the receptacle may have already taken place. If the contents of the receptacle are for any reason explosive, toxic or valuable, the failure of a mechanical seal not only can be dangerous to the health and safety of the workmen, but also can seriously damage expensive equipment and facilities and greatly increase the cost of processing or storing the particular contents.

Another object is, therefore, to provide an improved shaft sealing construction having the fluid-tight sealing action of a mechanical seal, but which is so constructed that if for any reason the mechanical seal should fail, the damaged seal may be readily replaced with an operable mechanical seal, without, however, necessitating the disassembly of the mixing apparatus, the removal of the shaft and agitator from the receptacle, the use of special tools, or the need of highly skilled workmen.

Another object is to provide a shaft sealing construction having the above advantages, which is provided with improved auxiliary sealing means, in addition to the mechanical seal, so that upon failure of the mechanical seal, the opening through the wall of the receptacle around the shaft can be quickly and easily resealed by the auxiliary sealing means, thereby preventing loss of content and facilitating the replacement of the mechanical seal.

Another object is to provide a shaft sealing construction of the above nature in which the auxiliary sealing means also provides a substantially fluid-tight seal so that our shaft sealing construction may be safely used with pressure receptacles, or in positions below the level of the contents within the receptacle.

Another object is to provide a shaft sealing construction having the above advantages in which means are provided for securely holding the auxiliary sealing means in sealing engagement while the damaged mechanical seal is being repaired or replaced.

Another object is to provide a shaft sealing construction of the above character in which, after the mechanical seal has been replaced, the auxiliary sealing means may be disengaged to bring the new mechanical seal into sealing position, so that the operative rotation of the shaft may be resumed to continue and complete the mixing operation.

A further object is to provide a shaft sealing construction of the above character in which the auxiliary sealing means may be brought into sealing engagement, the damaged mechanical seal replaced with an operable mechanical seal, and the replacement mechanical seal moved into sealing position with a minimum of time and effort, and without necessitating the removal of the agitator shaft from the receptacle or the disassembly of the agitating apparatus.

Still a further object is to provide a shaft sealing construction having the above advantages which is highly reliable in operation, and requires a minimum of parts which may be readily and economically manufactured and assembled.

To these and other ends the invention resides in certain improvements and combinations of parts, all as will be hereinafter more fully described, the novel features being pointed out in the claims at the end of the specification.

In the drawings:

Fig. 8 is similar to Fig. 7, but shows the double mechanical seal moved out of sealing position and the auxiliary sealing members in sealing position;

The preferred embodiment of the present invention, herein disclosed by way of illustration, comprises improvements in a device for sealing the opening around a rotatable shaft, as for example, the impeller or agitator shaft of a mixing device such as that disclosed and claimed in the patent to Richard D. Boutros, No. 2,612,391, granted September 30, 1952. This application is a continuation of our copending application, Serial No. 421,732, filed April 8, 1954, Sealing Means for Receptacle Shaft Opening, and later abandoned.

More specifically, our invention provides means whereby a mechanical seal can be safely used with mixing apparatuses without fear of appreciable loss of contents upon failure of the seal. To this end, we provide a mixing apparatus with at least two shaft sections which may be separated without disassembling the mixer, thereby allowing the mechanical seal to be readily replaced. In addition, when the mixer is of the side or bottom entering type, or is used in any position with vessels under pressure, our invention also provides auxiliary sealing means within the receptacle whereby the opening may be quickly secured upon the failure of the mechanical seal. Although these auxiliary sealing members do not allow the shaft to be rotated, they are effective and serve their necessary purpose in that they provide an effective seal during the time that the shaft sections are stationary and the damaged mechanical seal is being repaired or replaced. The details of our above invention will be presently described.

Our shaft seal construction, shown generally at 21 (Figs. 1 and 3), preferably comprises an annular member 23 (Fig. 3) which is fastened to and, in effect, becomes a part of a closure or flange member 25 as by welding 27, or other known and suitable means. Flange 25 is formed with a series of spaced openings or holes through which suitable bolts 29 are passed for connecting said plate and annular member 23 to the flanged nozzle 31 of a fluid-containing receptacle or tank (not shown), as is well understood in the art. While we preferably form annular member 23 and closure member 25 separately and then combine them, as above, it will be readily understood that members 23 and 25 may be initially formed as a unitary member. Flange 25 has a sheet of corrosion-resistant metal 33 (Fig. 1) or other suitable material fastened to the inner surface thereof for protecting it from the corrosive action of the contents of the receptacle.

Figures 1, 2:
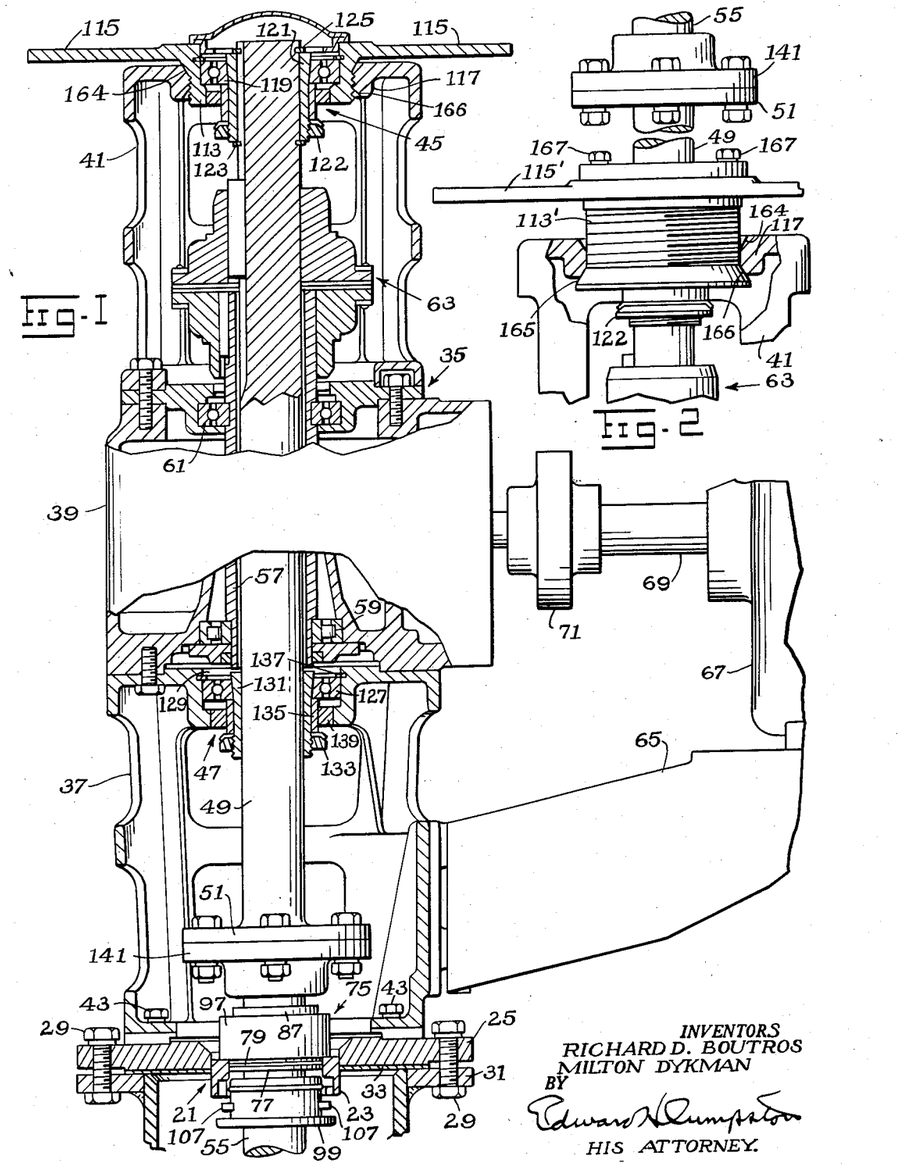
Fig. 1 is a fragmentary side elevation, partly broken away and partly in section, of a mixing device and shaft sealing construction embodying the present invention and shown as applied to the top of a mixing receptacle.
Fig. 2 is a fragmentary side elevation of the upper portion of the mixing apparatus shown in Fig. 1, but showing a slightly modified construction adapting the mixing apparatus for application to the bottom of a mixing receptacle.
Figures 3, 4:
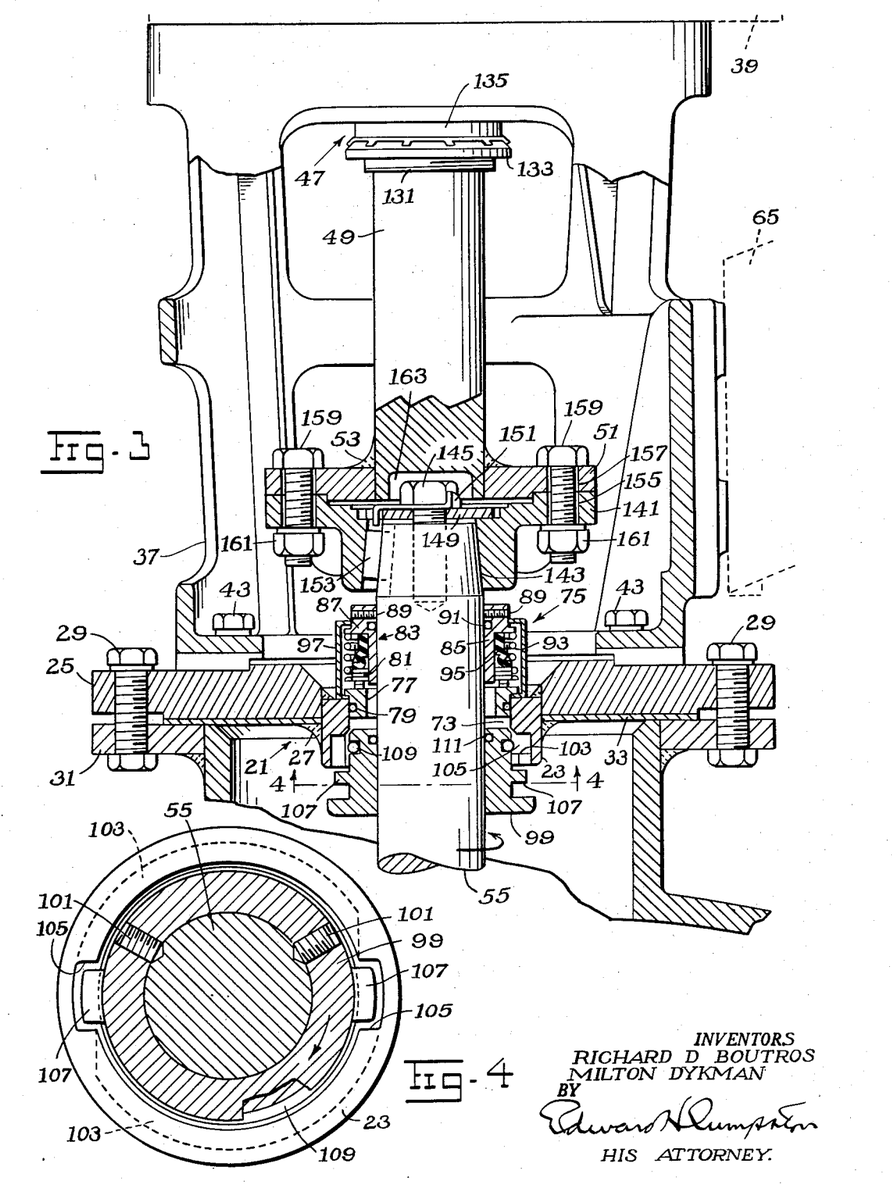
Fig. 3 is an enlarged sectional elevation of the shaft seal construction shown in Fig. 1.
Fig. 4 is an enlarged sectional bottom plan view substantially along the line 4—4 in Fig. 3.

The mixing apparatus shown generally at 35 (Fig. 1), comprises an elongated frame formed by the bolting together of inner, middle and outer sections 37, 39, and 41, respectively (Fig. 1). Frame member 37 is secured at the inner end thereof to flange 25 by bolts 43, as shown in Figs. 1 and 3. Outer frame members 41 and 37 have adjacent the outer ends thereof suitable bearing structures, shown generally at 45 and 47, respectively (Fig. 1) for rotatably supporting an agitator drive means or shaft 49 (Figs. 1 and 3) which extends longitudinally through said frame members, to a point near the inner end of inner frame member 37 where shaft 49 has a suitable flange coupling member 51 (Fig. 3) secured thereto by welding 53, or other suitable and known means. Drive means 49 is connected by means hereinafter described to a suitable agitating or impelling device, as for example, a propeller (not shown) secured to the inner end of a second or inner shaft section 55 (Fig. 3) for providing the desired agitation within the receptacle, as is well understood in the art. A hollow quill 57 (Fig. 1) surrounding the mid-portion of shaft 49 is supported at the inner and outer ends thereof by quill bearings 59 and 61, respectively, and has its upper end connected to shaft 49 by a flexible coupling, shown generally at 63, of known and suitable construction. Frame member 37 has a transversely projecting arm 65 (Fig. 1) for supporting an electric motor 67 which furnishes the power for operating the mixer. Motor shaft 69 (Fig. 1) is connected by a coupling 71 to a worm (not shown) which in turn drives a worm gear (not shown) attached to quill 57, as disclosed more fully in the above patent.

Referring now to Fig. 3 and the construction of the shaft seal, annular member 23 extends at right angles to plate 25 and has an opening 73 bored therein, through which shaft section 55 passes. A mechanical seal, shown generally at 75, which is capable of providing a substantially fluid-tight seal, is mounted adjacent the outboard end of member 23. This seal which is of known construction, comprises a stationary sealing ring or member 77 of steel or brass, or other suitable material, which is adapted to closely engage the inner surface of annular member 23, as shown in Fig. 3. Ring 77 is provided adjacent the outer end thereof with an outwardly extending flange for limiting the telescopic movement of the ring within annular member 23. Ring 77 is formed with a circumferential notch or recess which engages and holds an O ring 79 of natural or synthetic rubber of other suitable known material, for peventing leakage between ring 77 and annular member 23. The outer surface of ring 77 is highly finished and forms an effective and substantially fluid-tight seal with a correspondingly highly finished surface of a second sealing ring 81 which is preferably of friction reducing, non-corrosive material such as carbon, brass or the like. The inner diameter of ring 77 is somewhat greater than shaft 55 so as to provide clearance therebetween in order that any vibration or flexing of the shaft will not be transmitted to the ring and so that the fluid contents of the receptacle may reach the rings for lubricating and cooling the same.

Whereas ring 77 is stationary and is detachably fixed to closure member 25 through annular member 23, ring 81 is associated with or mounted on shaft 55 for rotation therewith. The means for mounting ring 81 on shaft 55 preferably comprises a floating seat or collar member, shown generally at 83 (Fig. 3) having a cylindrical body portion 85 and a collar portion 87. Member 83 is adapted to be held in adjusted position longitudinally along shaft 55 by a pair of set screws 89 (Fig. 3) and is provided with a notch or groove which receives and holds an O ring 91 of natural or synthetic rubber, or other suitable or known material, which in conjunction with the close fitting engagement between member 83 and shaft 55, prevents the contents of the receptacle from passing outwardly between said member and shaft.

Sealing ring 81 is preferably mounted on member 83 by means of a yieldable or resilient connection comprising a coil spring 93, as shown in Fig. 3. A flexible diaphragm or bellows 95 is provided above ring 81 and between spring 93 and member 85 for sealing ring 81 to member 83 and cushioning the resilient action of spring 93, as well understood in the art. A cylindrical cover or shield 97 having inwardly extending flanges at opposite ends thereof extends under the outer flange portion of stationary ring 77 and extends inwardly over the flange portion of collar member 87, as shown in Fig. 3. Thus, the above mechanism provides an efficient and substantially leak-proof seal, the sealing action taking place between the finished surfaces of sealing rings 81 and 77 which are resiliently held together in sealing engagement by spring 93. Rotatable ring 81 has a slightly larger inner diameter than the external diameter of sleeve portion 85 so as to allow the shaft to flex or bend slightly without engaging the seal. It is to be understood that the composition of O rings 79 and 91 and flexible diaphragm 95 may be varied to best resist the corrosive action of the particular substance within the receptacle.

However, although sealing rings 77 and 81 afford a substantially leak-proof seal capable of years of efficient service, where one of these rings is made, as commonly the practice, of a frangible material, such as carbon, and such material begins to disintegrate, its disruption is apt to be extremely rapid with little if any warning, unlike the action of a stuffing box and a packed shaft seal. Consequently, it has not been feasible to use such seals in certain instances where the contents of the receptacle are particularly hazardous or valuable in that, when one of the sealing rings is fractured, there is a rapid loss of contents through the damaged seal.

It is to overcome this difficulty that our present invention is particularly well adapted and to this end, we not only provide novel auxiliary sealing means which may be brought into engagement to temporarily seal the shaft opening, but we also provide means whereby the damaged mechanical seal may be removed and replaced with a new mechanical seal, as hereafter more fully described.

The auxiliary sealing means comprises a sealing member 99 (Fig. 3) which is held on inner shaft section 55 by set screws 101 (Fig. 4). The inner end of annular member 23 forms the other auxiliary sealing member and to this end, it is formed with an interrupted thread 103 (Fig. 3) having spaced access openings 105 (Fig. 4). Sealing member 99 is formed with a pair of oppositely extending lugs 107 (Fig. 3) which, when shaft 55 is moved upwardly from its position shown in Fig. 3 to its position shown in Fig. 5, pass through openings 105 into engagement with thread 103. As shaft 55 is rotated in a clockwise direction, as viewed in Fig. 6, lugs 107 move along thread 103, thereby securely holding sealing members 99 and 23 in sealed interengagement and holding shaft section 55 in its outboard or uppermost position, as viewed in Fig. 5. In order to improve the sealing action between members 99 and 23, member 99 is preferably provided with a circumferentially extending groove or recess carrying an O ring 109 (Fig. 3) of natural or synthetic rubber, or other suitable material. When member 99 is moved into engagement with member 23, ring 109 is interposed between the sealing surfaces of said members and acts as a gasket to improve the sealing action thereof. Member 99 has a second O ring 111 (Fig. 3) adjacent the inner surface thereof for sealing member 99 to shaft section 55.

Figures 5, 6:
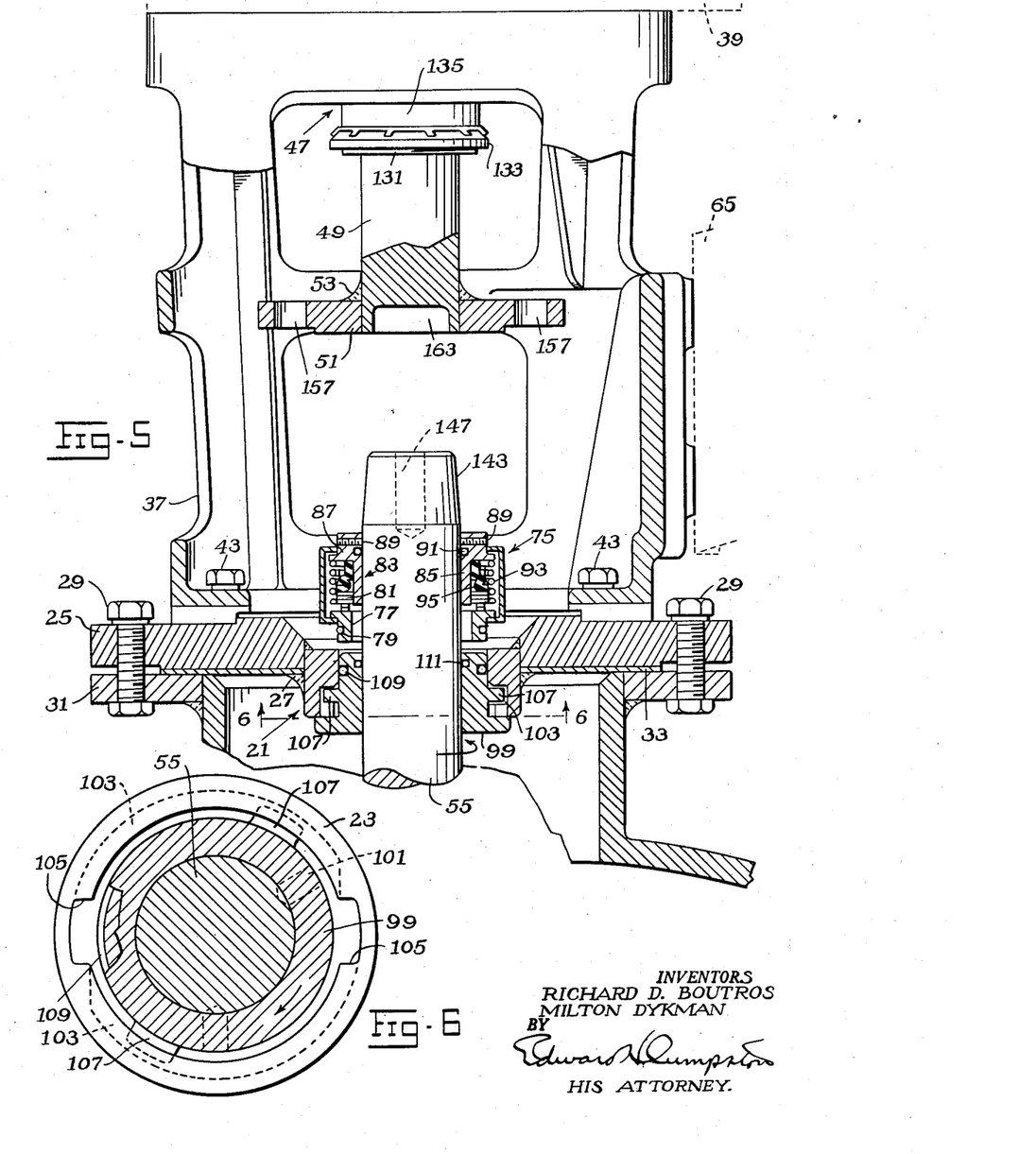
Fig. 5 is similar to Fig. 3, but shows the mechanical seal moved out of sealing position and the auxiliary sealing members in sealing position.
Fig. 6 is an enlarged sectional bottom plan view substantially along the line 6—6 in Fig. 5, but with the inner shaft rotated to lock the auxiliary sealing members.
Figure 6:
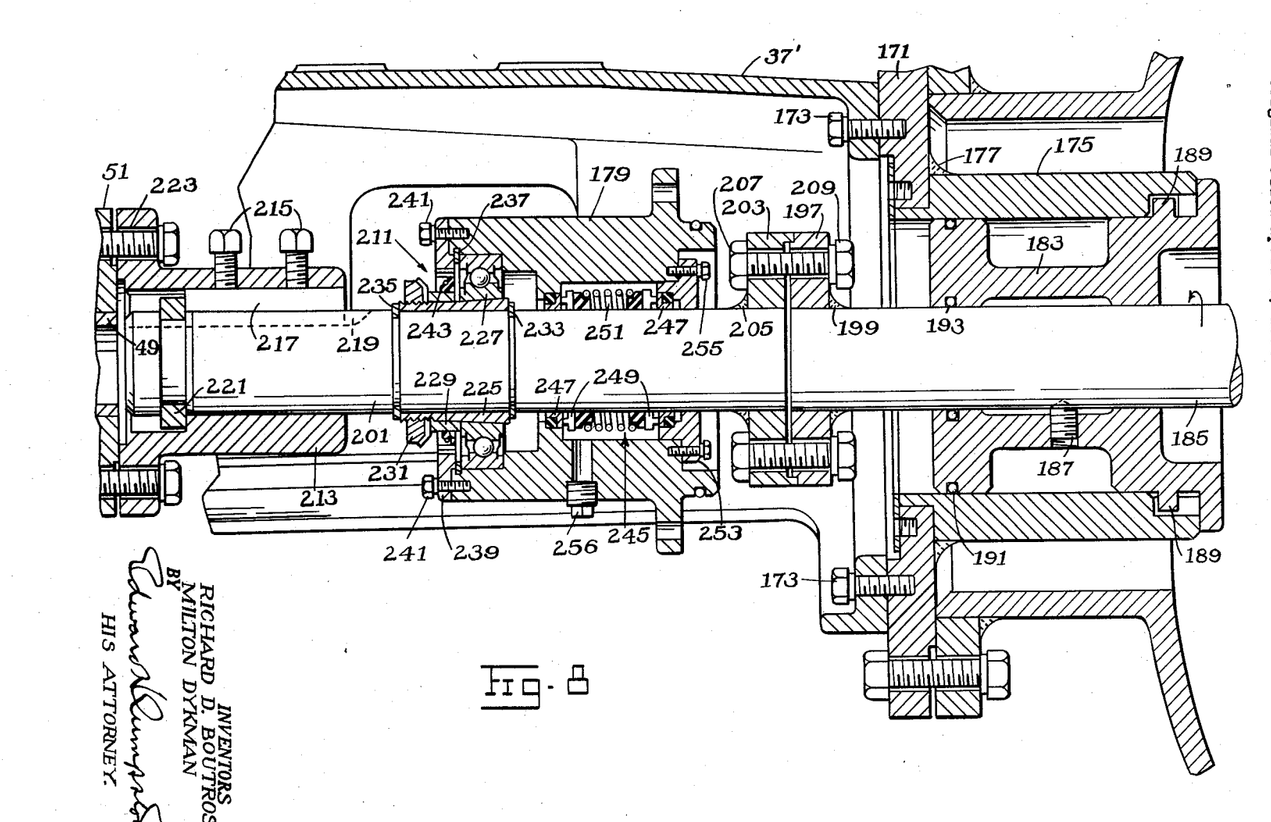

The means for moving shaft sections 49 and 55 axially or longitudinally through the mixing apparatus from their first positions shown in Fig. 3 to their second positions shown in Fig. 5 comprises a movable bearing housing 113 (Fig. 1) having oppositely extending handles 115. Housing 113 threadly engages a flange 117 (Fig. 1) located at the outer or free end of frame section 41. As explained more fully in the above Boutros patent, bearing housing 113 has a chamber formed therein supporting a ball bearing race 119 which has a tapered internal opening engaging the tapered portion of a split sleeve 121 which in turn is held in position on shaft 49 by means of a clamping nut 122 and a pair of snap rings 123 and 125 located adjacent the inner and outer ends thereof. Bearing 119 rotatably supports the upper end of shaft section 49, but is prevented from moving longitudinally therealong, so that when shaft 49 is loosened from lower bearing 47 and flexible coupling 63, rotation of housing 113 by means of handles 115 causes bearing 119, sleeve 121 and shaft section 49 to move as a unit axially along the mixing device.

The lower shaft bearing assembly 47 through which shaft 49 moves, as above, is similar to upper shaft bearing 45 and comprises a ball bearing race 127 (Fig. 1) which is mounted in an opening or recess 129 formed adjacent the upper or outer end of frame section 37. As shown in Fig. 1, bearing 127 has a tapered internal opening engaging the corresponding tapered outer surface portion of a split sleeve 131 which is fitted to shaft section 49, and held against longitudinal movement therealong by means of a clamping nut 133 which threadedly engages the lower split end of sleeve 131. In addition to clamping sleeve 131 to shaft 49, nut 133 bears against the lower end of a solid sleeve 135 which in turn engages ball bearing 127 for moving the same longitudinally to bring the opposing tapered surfaces of bearing 127 and sleeve 131 into contact. A snap ring 137 is located adjacent the upper, open end of chamber 129 for limiting the longitudinal movement of bearing 127. A dust seal 139, of any known and suitable construction is located between sleeve 135 and the lower portion of chamber wall 129, as shown in Fig. 1.

Thus, to move shaft sections 49 and 55 axially to bring sealing members 99 and 23 into engagement, as described above, it is only necessary to loosen clamping nut 133 of shaft lower bearing assembly 47, loosen flexible coupling 63 and rotate upper bearing housing 113. In order to bring sealing members 99 and 23 into sealing engagement, locking lugs 107 must be aligned with access openings 105, and to that end, suitable indices are provided on shaft section 55 and the frame of the mixing device. After shaft sections 49 and 55 have been moved through a sufficient distance to bring lugs 107 into engagement with thread 103 (Fig. 5), shaft sections 49 and 55 are then rotated by hand or by a special wrench (not shown) in the direction of the arrows shown in Figs. 5 and 6, through a suitable degree of angular rotation, as for example, 120°, thereby moving lugs 107 from their positions shown in Fig. 4 to their locked positions shown in Fig. 6. In this position, sealing members 99 and 23 are securely locked in sealing engagement and shaft section 55, to which member 99 is securely attached, is positively held in its outward position by the shaft holding means, lugs 107 and the thread 103. During the above axial movement of the shaft sections necessary to bring the auxiliary sealing members into their above sealing positions, mechanical seal 75 which is fixed to shaft 55, is preferably concurrently moved out of engagement with member 23 and into position for removal and replacement thereof, as hereinafter described.

In order to facilitate the removal and replacement of mechanical seal 75, flange 141 (Fig. 3) on the outboard end of shaft section 55 is readily demountable from the shaft. To this end, flange 141 is formed with a tapered opening adjacent the center thereof for engaging an oppositely tapered portion 143 adjacent the outboard or upper end (as viewed in Figs. 3 and 5) of shaft section 55. Flange member 141 is detachably secured to shaft 55 by means of a bolt 145 (Fig. 3) which engages a tapped longitudinally extending opening 147 (Fig. 5) adjacent the outer end of shaft 55. Bolt 145 bears on a washer 149 (Fig. 3) which in turn engages a recessed seat on flange 141 and forces the same downwardly along shaft 55. A locking washer 151 (Fig. 3) is provided for preventing rotation of bolt 145 relative to shaft 55 while the tapered portion 143 of shaft 55 and the tapered internal bore of flange 141 are formed with mating recess portions forming a keyway for the reception of a key 153 (Fig. 3) by means of which flange 141 is securely prevented from rotating relative to shaft 55. The above tapered fit between flange 141 and shaft 55 assures quick and easy mating of the parts, assures perfect alignment between flange 141 and shaft section 55, and provides a strong, rigid and positive connection between the flange and shaft. Flange 141 is provided with a series of spaced holes 155 (Fig. 3) which are adapted to mate with similar holes 157 (Fig. 3) in flange member 51 mounted on shaft section 49. Flange members 141 and 51 are detachably secured together by means of bolts 159 and nuts 161, as shown in Fig. 3, thereby making shaft sections 49 and 55 in effect a single shaft. Upper shaft section 49 is recessed adjacent the center thereof as at 163 to provide clearance for the head of bolt 145, as shown in Fig. 3.

Thus, it will be readily seen that when mechanical seal 75 fails, the leakage therethrough may be quickly checked by stopping the agitator, aligning the proper indices on inner shaft section 55 and the frame of the mixing device, moving shaft sections 49 and 55 axially (upwardly as viewed in Figs. 3 and 5) by rotating upper bearing housing 113, thereby bringing auxiliary sealing members 99 and 23 into sealing engagement. If it is desired to continue the mixing operation, which is usually the case, all that is necessary to do after sealing members 99 and 23 are brought into their positions as shown in Fig. 5, is to rotate shaft sections 49 and 55 and sealing member 99 until lugs 107 are securely locked in threads 103, as shown in Fig. 6. Thereafter, bolts and nuts 159 and 161 are removed allowing upper shaft 49 to be separated from engagement with lower shaft 55. Shaft 49 is then moved further upwardly, manually or by means of a hoist, crane, or other suitable means to its position, shown in Fig. 5, and flange member 141 is removed from inner shaft section 55 by removing bolt 145. This allows the damaged mechanical seal 75 to be removed from shaft section 55, by loosening set screws 89 and then sliding the entire mechanical seal as a unit upwardly over the free end of shaft section 55. Fig. 5 shows shaft sections 49 and 55 separated, flange member 141 removed from shaft section 55 and mechanical seal 75 in position for removal, as above. A new mechanical seal assembly may be slipped into position over the tapered free end of shaft 55 and secured to the shaft in the proper position by set screws 89. Thereafter, flange member 141 is remounted on shaft 55, outer shaft section 49 is lowered into engagement with shaft 55 and flange members 51 and 141 rejoined by bolts 159 and nuts 161. Thereafter, the mixing device may be returned to operative condition by merely unlocking sealing members 99 and 23 and threading bearing housing 113 downwardly into engagement with the tapered seat 164 on the outer free end of frame member 41, thereby bringing the new mechanical seal into sealing position while sealing members 99 and 23 are concurrently moved out of sealing interengagement. It will be understood that although we have shown the mechanical seal 75 as moving upwardly with shaft 55, the seal may be loosened by loosening set screws 89, and then the shaft moved to its outward position through the seal. Thereafter, flange member 141 is removed and the seal is slid upwardly over the free end of shaft section 55, as above.

Thus it will be seen that our invention provides a novel and highly practical shaft seal construction whereby a mechanical seal having an efficient, substantially fluid-tight sealing action may be safely used without, however, having the usual disadvantages of such a seal. That is, failure of the seal no longer means a considerable loss of fluid content. With our improved shaft seal construction, should the mechanical seal fail, the mixing apparatus may be quickly shut off and auxiliary sealing members 99 and 23 quickly brought into and locked in sealing position. Thereafter the connection between the shaft sections may be safely disassembled, the mechanical seal removed as a unit and a new mechanical seal substituted therefor. The above procedure is easily reversed to return the mixing apparatus to operative position.

The above apparatus is particularly well suited for use as a top entering mixer for closed top receptacles where the contents are under a pressure either greater or less than atmospheric pressure. Similarly, the above shaft seal construction is well adapted for use with a side entering mixer, or, as hereafter pointed out, with a bottom entering mixer. Of course, this device can be used as a top entering mixer with an open top receptacle, but then, there is no need for any seal around the shaft as it enters the tank.

Regardless whether the above shaft seal is used with a bottom or side entering mixer, or with a top entering mixer where the contents of the receptacle are under pressure different from atmospheric, the construction and operation of the shaft seal is the same. That is, in all instances it is desirable to move the mixer shaft axially to bring the auxiliary sealing members into sealing position. The mixing apparatus shown in Fig. 1 is readily adaptable for use as a top entering or as a side entering mixer, but in the case of a bottom entering mixer it would be necessary to invert the apparatus from its position shown in Fig. 1 to obtain the above axial movement of the mixer shaft necessary to actuate the auxiliary sealing members. However, it is undesirable to invert the apparatus shown in Fig. 1, for it renders ineffective the lubricating system for the quill and worm gear (not shown). In order to be able to satisfactorily use the mixing apparatus shown in Fig. 1 as a bottom entering mixer, as shown in Fig. 2, we have made certain modifications, as hereinafter pointed out, in the construction and arrangement of the agitator supporting and driving parts in the above mixing apparatus.

Referring to Fig. 1, bolts 43 are removed, allowing flange 25 to be removed from the lower end of frame member 37 and a suitable base (not shown) substituted therefor. Closure member or flange 25 is now turned over and bolted directly to the mating flange on the bottom of the receptacle, with corrosion-resistant plate 33 facing upwardly so as to protect the flange from the contents of the receptacle in the same manner as flange 41 in Figs. 6-8, inclusive, of the above Boutros patent. Flange 25 is now independent of the mixing apparatus and is connected thereto only through the mechanical seal and agitator shaft sections. However, flange 25 may be connected to the upper end of frame member 41 by means of a suitable structural member (not shown) similar to frame member 37. Mechanical seal 75 is still in the same position relative to flange 25, as before, and inner shaft section 55 projects outwardly through the flange and mechanical seal in the same manner as shown in Figs. 3 and 5, except that now tapered end 143 of shaft 55 is lowermost rather than uppermost as in the embodiment shown in Figs. 3 and 5.

As shown in Fig. 2, agitator shaft 49 is removed and inserted into the mixing apparatus with flange 51 uppermost and at a convenient distance above the top of the mixing apparatus. Shaft lower bearing 47 is the same as in Fig. 1, but in order to be able to move shafts 49 and 55 axially outboard, which in the case of a bottom entering mixer is downwardly, shaft upper bearing 45 is slightly modified. With the exception of the threaded bearing housing which engages the upper end of frame member 41, the upper bearing assembly is the same as shown in Fig. 1. However, as shown in Fig. 2, bearing housing 113' is constructed so that in its normal, locked position it projects upwardly beyond the upper edge of flange 117 of frame 41. Bearing housing 113' is provided at the lower end thereof with a tapered portion 165 which seats against a correspondingly tapered seat 166 (Fig. 2) in flange 117 when bearing housing 113' is in position for normal operation of the mixer. When it is desired to utilize the auxiliary sealing members, shaft lower bearing 47 is released, flexible coupling 63 is similarly released and threaded bearing housing 113' is moved axially downwardly by rotation thereof, thereby bringing the auxiliary sealing members into sealing position, as described above. In order to aid in the rotation of bearing housing 113', a handle 115' is bolted thereto by bolts 167. Thus it will be seen that the sealing action is the same regardless of the orientation of the mixer and the shaft seal construction, but in the case of a bottom entering mixer, the flange connection between shaft sections 49 and 55 is located outside and above the frame of the mixing apparatus, whereas when the construction is utilized in a top or side entering mixer, the above shaft connection is located within lower frame member 37, as shown in Figs. 1, 3 and 5.

Figure 7:
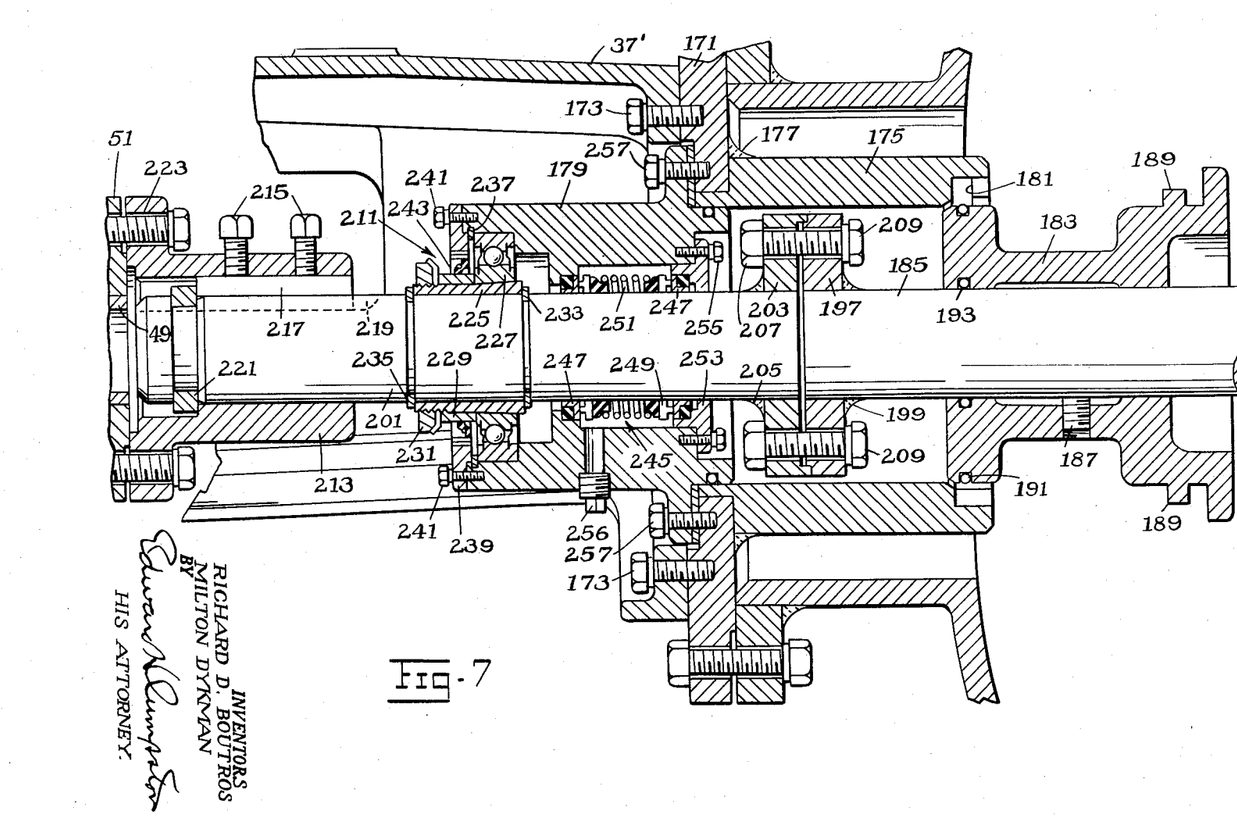
Fig. 7 is a sectional side elevation of a slightly modified construction, having a double mechanical seal and shown in position for application to the side of a mixing receptacle.

In Figs. 7 and 8 we have shown a slightly modified shaft seal construction in which the agitator shaft comprises at least three sections. In Fig. 7 the shaft seal is shown as applied to a side entering mixer, with only the bottom frame member 37' thereof being shown, the rest being the same as shown in Fig. 1. However, in order to allow proper replacement of the mechanical seal and allow sufficient room for the components thereof, lower frame member 37' is substantially longer than member 37 shown in Fig. 1, as for example, about 10" to 12" longer. The construction shown in Figs. 7 and 8 is similar to that discussed above in that combined auxiliary sealing means and shaft holding means are provided within the receptacle for temporarily sealing the opening and holding the inner shaft section in position thereby allowing removal and replacement of the mechanical seal. However, in the construction shown in Figs. 7 and 8 a complete section of the agitator shaft, having both the mechanical seal and lower bearing structure in position thereon, is removed as a unit, by means to be presently described.

As shown in Figs. 7 and 8, mixer frame member 37' is bolted to a suitable closure member or flange 171 by bolts 173. An annular member 175 is secured as by welding 177 to the tank side of flange 171 and has a portion thereof extending through an opening formed in flange 171, as shown in Fig. 7. The outboard portion of member 175 which projects through the opening in flange 171 forms a seat for the housing 179 of the mechanical sealing means, as hereafter described, while the inboard portion of member 175 has an inwardly turned flange formed with an interrupted thread 181, similar to the thread 103 formed in member 23 and shown in Fig. 3. A second auxiliary sealing member 183 is mounted on the inner shaft section 185 by a suitable set screw 187, as shown in Fig. 7. Auxiliary sealing member 183 is formed with a pair of oppositely extending lugs 189 for engagement with interrupted thread 181, for holding the inner shaft section in position, when the auxiliary sealing members are brought into sealing engagement shown in Fig. 8, as hereafter described. In order to improve the sealing action, member 183 has a circumferentially extending groove adjacent the outer end thereof, which carries an O ring 191 of natural or synthetic rubber or other suitable material. O ring 191 is positioned so as to be located between the opposing surfaces of sealing members 183 and 175, as shown in Fig. 8, to improve the sealing action thereof. A second O ring 193 is located on the inside of member 183 to seal the same on shaft section 185 and prevent leakage therebetween.

Shaft section 185 terminates a short distance outboard of sealing member 183 and has a suitable flange member 197 mounted thereon as by welding 199, or other suitable means. An intermediate shaft section 201 connects drive means or outer shaft section 49 and inner shaft section 185. Shaft section 201 has a flange member 203 mounted adjacent the inner end thereof as by welding 205, or other suitable means, as shown in Figs. 7 and 8. A series of bolts 207 and nuts 209 connect flange members 197 and 203, and thus shaft sections 185 and 201. Intermediate shaft section 201 extends through housing 179 and shaft lower bearing assembly, shown generally at 211 (Fig. 7), and has secured on the outboard end thereof a demountable flange member 213. Flange 213 has a pair of set screws 215 which engage a key 217 seated partially within a keyway 219 formed in shaft section 201 and partially within a corresponding keyway formed in flange member 213. A split thrust ring 221 prevents key 217 from moving longitudinally to the left while the tapered end of keyway 219 prevents movement to the right along shaft section 201, and thus, flange member 213 is securely fixed to shaft section 201 and prevented from moving longitudinally therealong or rotating relative thereto, except when set screws 215 are loosened for demounting the flange. Flange 213 is provided with suitable holes 223 for engagement with bolts such as bolts 159 (Fig. 3) for attaching flange 213 to flange 51 on outer shaft section 49.

As stated, intermediate shaft section 201 passes through the shaft lower bearing assembly 211 which comprises a split sleeve 225, a tapered ball bearing race 227, a solid sleeve 229 and a clamping nut 231, similar to the corresponding parts of the lower bearing assembly 47 shown in Fig. 1 and as described earlier. Ring 225 is prevented from moving longitudinally along shaft section 201 by suitable snap rings 233 and 235 (Fig. 7). Bearing member 227 seats within a recess formed in housing member 179 and is thus prevented from moving to the right, as viewed in Fig. 7, while a ring 237 prevents the bearing from moving to the left, as viewed in Fig. 7. A retaining flange member 239 is mounted on housing member 179 by bolts 241 and engages one side of a suitable oil seal 243, the other side of which engages sleeve 229.

Housing member 179 forms a continuation and, in effect, apart of closure member 171 and provides a support for the stationary sealing ring, as hereafter described. Members 179 and 171 together reduce the size of the opening in the wall of the receptacle through which the mixer shaft extends to a diameter slightly greater than the diameter of the shaft. The remainder of the opening lies between the shaft and the inner diameter of member 179, and is sealed by the mechanical seal, which as shown generally at 245 (Fig. 7), comprises a double mechanical seal of known construction, having a pair of spaced stationary sealing rings 247 and a pair of rotatable sealing rings 249 which are yieldably held in sealing position against rings 247 by a single spring member 251, as shown in Fig. 7 and as well understood in the art. A seal retainer 253 is held in position on the inner or right hand end of member 179 by suitable bolts 255, as shown in Fig. 7. A plug 256 closes the end of a tapped opening through which a suitable lubricating and cooling medium may be introduced. Thus it will be seen that when seal housing 179 is released from flange 171 by loosening and removing connecting bolts 257, the entire seal housing 179, bearing assembly 211 and double mechanical seal assembly 245 will move with shaft section 201 longitudinally of the mixing apparatus. This movement of shaft 201 and the above associated parts can be seen by comparing Figs. 7 and 8. Fig. 7 shows the shaft in its inboard, operative position, the auxiliary sealing members being unsealed and the mechanical seal 245 sealing the opening around the agitator shaft. Fig. 8 shows shaft sections 201 and 185, after they have been moved outboard, or to the left as viewed in said figure by the corresponding outboard movement of bearing housing 113 and outer shaft section 49, which are not shown in Fig. 8. Although the movement of shaft sections 201 and 185 from their positions shown in Fig. 7 to the positions shown in Fig. 8, moves housing 179 out of engagement with flange 171, thereby interrupting the sealing action of mechanical seal 245, the same longitudinal movement concurrently brings auxiliary sealing members 183 and 175 into sealing engagement as shown in Fig. 8. After shaft sections 201 and 185 have been rotated to securely interlock the shaft holding means 189 and 181 on the auxiliary sealing members, it is a simple matter to remove shaft section 201 by merely unbolting the connections at the opposite ends thereof. Thereafter, the mechanical seal may be disassembled and repaired, or if desired, an entire unit comprising intermediate shaft section 201, bearing assembly 211, mechanical seal 245, bearing housing 179, and flange connection 213 and associated parts may be substituted for the original parts. We believe this latter procedure to be preferable in that it is much quicker and can be done by any mechanic without the aid of special tools or special knowledge of the critical adjustments of the mechanical seal. In any event, as flange 213 is detachable, both the seal and bearing assemblies may be taken down and the necessary parts replaced. After repairs have been made or a new unit inserted, the necessary connections are made at the opposite ends of shaft section 201 to the inner and outer shaft sections 185 and 49, respectively. The shaft sections are rotated to unlock sealing members 183 and 175, and then they are moved inboard to separate said seal members and bring sealing housing 179 into position for bolting the same to flange 171, after which the mixing operation may again be resumed.

The shaft seal construction shown in Figs. 7 and 8 may be used with a side entering mixer, as shown, or it may be likewise used with a top entering mixer where it would be particularly advantageous with closed top receptacles when the contents of the receptacle are under pressure other than atmopheric. Similarly, the shaft seal construction may be used with a bottom entering mixer in which case outer shaft section 49 would project upwardly through the top of the mixing apparatus, as shown in Fig. 2 and as described above.

Figure 9:
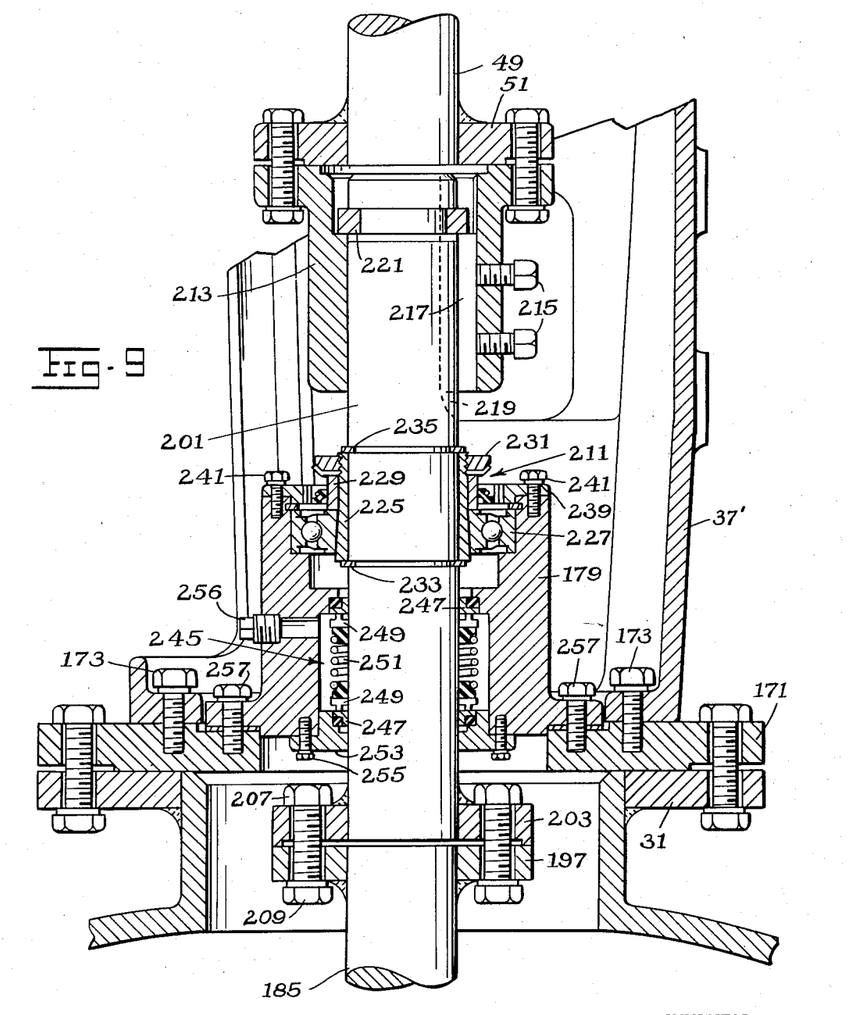
Fig. 9 is a sectional elevation of the sealing construction shown in Figs. 7 and 8, but without any auxiliary sealing members, and as applied to the top of a mixing receptacle.
Figure 10:
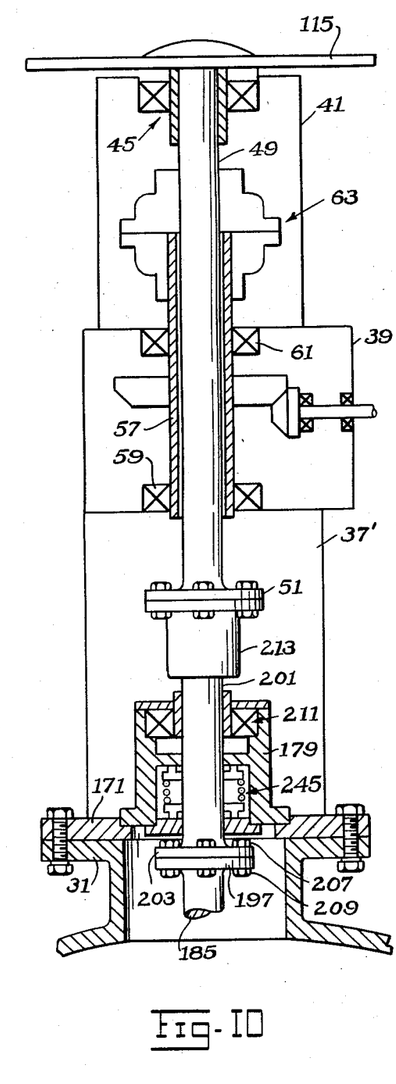
Fig. 10 is a schematic side elevation of the mixing apparatus shown in Fig. 1 and the shaft seal construction shown in Fig. 9, showing the same in sealing position.
Figure 11:
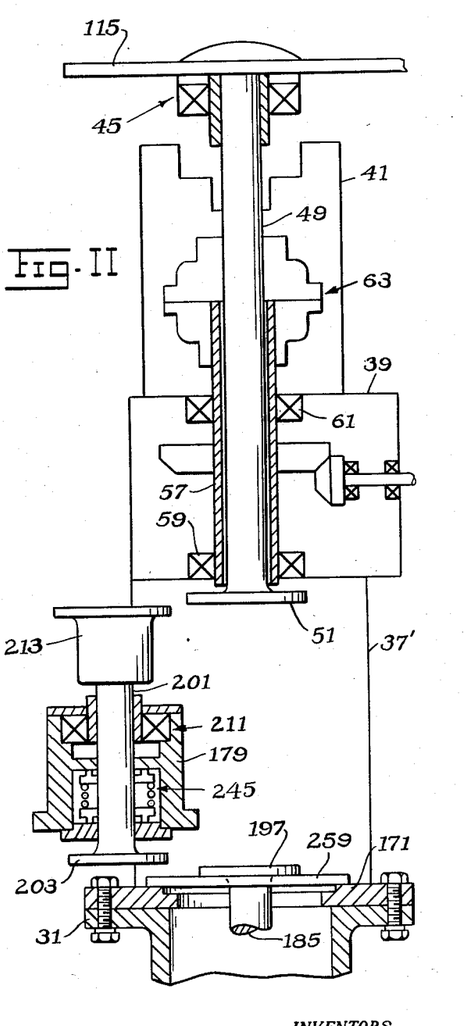
Fig. 11 is similar to Fig. 10, but shows the inner and outer shaft sections raised and the shaft seal construction separated therefrom and positioned for removal and replacement.

In instances where the mixer will be used as a top entering mixer with receptacles in which the contents are at atmospheric pressure, or where the vessel pressure can be released, it is not necessary to provide the above auxiliary sealing means, and to that end, we have shown in Fig. 9 a simplified and less expensive construction which is the same as that shown in Figs. 7 and 8 with the exception of the deletion of auxiliary sealing members 175 and 183 together with shaft holding means 189 and 181. Figs. 9 and 10 show the parts in sealing position while Fig. 11 shows the shaft sections in their raised or outboard positions, and intermediate shaft section 201 and associated parts partially removed for purposes of clarity. With the device shown in Figs. 9–11, it is necessary to insert a yoke or supporting bar 259 (Fig. 11) under flange 197 on inner shaft section 185 to hold the same in its raised or outboard position while intermediate shaft section 201 is being removed and replaced by a similar section, as shown in Fig. 11. The sealing action of the double mechanical seal is the same as that shown in Figs. 7 and 8 and the means for raising and lowering the shaft sections is the same as that shown and described above. Of course, the seal shown in Figs. 9–11 could be used with a side entering or bottom entering mixer, but its use would not be warranted except under extreme circumstances, for there is no means whereby the tank can be temporarily sealed when the double mechanical seal fails.

The embodiments shown in Figs. 7–11, inclusive, have the further advantages that the lower bearing for the agitator shaft is located in close proximity to the mechanical seal. This is important, for many types of rotary mechanical seals are unable to accommodate shaft deflections and vibrations without serious damage. Consequently, positioning of the lower bearing assembly close to the mechanical seal reduces the stresses on the seal and greatly increases the life thereof. Thus, we have retained the fundamentally good practice of carrying the agitator shaft in but two bearings, while providing adequate support for the shaft adjacent the mechanical seal so as to protect the seal from excess shaft deflection and vibration. Moreover, with the type of construction shown in Figs. 7–11 inclusive, the lower shaft bearing may be readily removed for repair or replacement without, however, requiring the complete disassembly of the mixing apparatus and without necessitating the draining or pumping out of the receptacle. In addition, both the mechanical seal and the shaft lower bearing may be removed when damaged and readily replaced by a mechanic having only the ordinary skill and without the use of special tools or special knowledge as to the critical adjustments of the mechanical seal.

Thus it will be seen that our invention provides a novel shaft seal which is particularly well adapted for sealing the opening around a rotatable shaft. Our seal construction utilizes the high efficiency of the mechanical seal, while at the same time it provides safety features not heretofore known whereby the mechanical seal may be safely used with dangerous or expensive fluids. As a result of our invention, it is no longer necessary to drain or pump out a receptacle when the mechanical seal fails, but rather, the opening around the shaft may be quickly and positively resealed by merely stopping the mixing apparatus and moving the agitator shaft outwardly to bring the auxiliary sealing members, located within the receptacle, into sealing engagement. In addition, our invention provides means whereby the damaged mechanical seal may be safely removed and replaced while the shaft opening is sealed by the above auxiliary sealing members. Thereafter, the operative rotation of the shaft may be resumed by merely moving the shaft inboard to its normal operative position, thereby releasing the shaft holding means, separating the auxiliary sealing members and bringing the new mechanical seal into sealing position.

It will be understood that although the various shaft sections shown in the drawings comprise a single length of shaft, our invention is by no means so limited, for any of the inner, intermediate or outer shaft sections may in turn comprise one or more lengths of shaft properly connected together. This is particularly true in regard to the inner shaft section when the mixer is used as a top entering mixer, for in such use it may be desirable to construct that portion of the agitator shaft within a receptacle in several segments or sections which are properly coupled together when in position within the receptacle, when the headroom above the receptacle is limited.

In addition, while we have shown auxiliary sealing members for sealing the receptacle opening during the repair or replacement of the mechanical seal, our invention is not so limited. When the mechanical seal is above the level of the liquid in the receptacle, as for example, when positioned as a top entering mixer, and the vessel either is not under pressure during the mixing operation, or the pressure may be safely released, it is not necessary to provide an auxiliary seal. However, since the inner end of the inner shaft section is unsupported axially, it is necessary to provide means for holding the inner portion of the shaft in position when the shaft sections are separated for the repair of the mechanical seal. Whether or not the gaskets on the auxiliary sealing means, O rings 109 and 111 or O rings 191 and 193 are omitted, we prefer to hold the inner shaft section in non-operative position by the interrupted screw thread means shown in Figs. 1, 3–8. However, it is readily apparent that when the auxiliary sealing means are omitted, any known and suitable means may be used for holding the inner shaft section in non-operative position, without departing from the spirit of our invention.

While in the specification and claims we have spoken of the rotatable sealing ring or rings, such as ring 81, as being "on" or "mounted on" the respective shaft section, it is not intended to imply that the rotatable sealing rings are of necessity in direct contact with the respective shaft sections, nor are we limited to such a construction. Indeed, as shown in Fig. 3, and as set forth earlier herein, ring 81 is not in direct contact with shaft section 55, but is preferably mounted on a floating seat or collar 83 which in turn is attached to shaft section 55. The only requirement is that the rotating rings rotate with the respective shaft sections and that they are in fluid-tight relationship therewith. Thus, when we refer to the rotatable sealing rings as being "on" or "mounted on" the respective shaft sections it is understood that we merely mean that the rings are associated with the shaft sections, or more specifically, that they rotate, and are in fluid-tight sealing engagement, with said shaft sections. This also applies to the description of the auxiliary sealing members 99 and 183 which are described in the specification and claims as being "on" a certain shaft section. While we have shown members 99 and 183 as being directly in contact with the respective shaft sections, this is not necessary, and the only requirement is that members 99 and 183 are substantially fixed against axial and radial movement relative to the shaft sections and are in substantially fluid-tight engagement therewith. Thus, when we refer to members 99 and 183 as being "on" a shaft section, we mean merely that they move with the respective shaft section and are in substantially fluid-tight sealing engagement therewith.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

We claim:

1. A sealed shaft construction for use with a fluid containing receptacle having an opening therein, said construction comprising rotatable shaft means including a plurality of axially aligned sections one of which may extend through said opening, said shaft means being movable in opposed axial directions from a first position to a second position and being unsupported axially at the inner end thereof when in said first position, means for separably connecting adjacent shaft sections; a closure member attachable to a receptacle adjacent the opening therein and having an opening therethrough for the reception of said shaft means, mechanical sealing means for sealing said opening in said closure member, said sealing means comprising a first sealing ring associated with said closure member and having a finished surface, a second sealing ring on one of said shaft sections for rotation therewith and having a finished surface engaging the finished surface of said first ring, means for holding said rings together with said finished surfaces in close fitting, substantially fluid tight engagement for sealing said opening in said closure member; means for moving said shaft means in an axial direction to said second position; and means for holding said shaft means in said second position thereof, said shaft sections being separable at said connecting means when said shaft means is in said second position thereof for removal and replacement of said mechanical sealing means.

2. A sealed shaft construction for use with a fluid containing receptacle having an opening therein, said construction comprising rotatable shaft means including a plurality of axially aligned sections one of which may extend through said opening, said shaft means being movable in opposed axial directions from a first position to a second position and being unsupported axially at the inner end thereof when in said first position; means for separately connecting adjacent shaft sections; a closure member attachable to a receptacle adjacent the opening therein and having an opening therethrough for the reception of said shaft means; mechanical sealing means for sealing said opening in said closure member, said sealing means comprising a first sealing ring associated with said closure member and having a finished surface, a second sealing ring on one of said shaft sections for rotation therewith and having a finished surface engaging the finished surface of said first ring, means for holding said rings together with said finished surfaces in close fitting, substantially fluid tight engagement for sealing said opening in said closure member; means for moving said shaft means and said mechanical sealing means in an axial direction to said second position; and means for holding said shaft means in said second position thereof, said shaft sections being separable at said connecting means when said shaft means is in said second position thereof for removal and replacement of said mechanical sealing means.

3. A sealed shaft construction for use with a fluid containing receptacle having an opening therein, said construction comprising rotatable shaft means extending through said opening, said shaft means comprising a plurality of axially aligned sections; means for separably connecting adjacent shaft sections; a closure member attachable to a receptacle adjacent the opening therein and having an opening therethrough for the reception of said shaft means; mechanical sealing means for sealing said opening in said closure member, said sealing means comprising a first sealing ring associated with said closure member and having a finished surface, a second sealing ring on one of said shaft sections for rotation therewith and having a finished surface engaging the finished surface of said first ring, means for holding said rings together with said finished surfaces in close fitting, substantially fluid-tight engagement for sealing said opening in said closure member, auxiliary sealing members inboard of said mechanical sealing means, one of said sealing members being associated with said closure member, the other of said auxiliary sealing members being on said shaft means and movable axially therewith; means for moving said shaft means axially to engage said auxiliary sealing members for temporarily sealing said opening in said closure member; and means for holding said auxiliary sealing members in sealing engagement, said shaft sections being separable at said connecting means for removal and replacement of said mechanical sealing means.

4. A sealed shaft construction as specified in claim 3 in which interengaging means for holding said auxiliary sealing members in sealing engagement comprises interrupted thread means on one of said auxiliary sealing members and projecting parts on said other auxiliary sealing member for engaging said thread means for holding said auxiliary sealing members in sealing engagement.

5. A sealed shaft construction for use with a fluid containing receptacle having an opening therein, said construction comprising rotatable shaft means having inner and outer axially aligned sections; a closure member attachable to a receptacle adjacent the opening therein and having an opening therethrough for the reception of an inner shaft section; mechanical sealing means for sealing said opening in said closure member, said sealing means comprising a first sealing ring associated with said closure member and having a finished surface, a second sealing ring on said inner shaft section for rotation therewith and having a finished surface engaging the finished surface of said first ring, means for holding said rings together with said finished surfaces in close fitting, substantially fluid-tight engagement for sealing said opening in said closure member; flange means on adjacent ends of said shaft sections outboard of said mechanical sealing means; means for securing said flange means together for joining said shaft sections; auxiliary sealing members inboard of said mechanical sealing means, one of said auxiliary sealing members being associated with said closure member, the other of said auxiliary sealing members being on said shaft means and movable axially therewith; means for moving said shaft means axially to engage said auxiliary sealing members for temporarily sealing said opening in said closure member; means for holding said auxiliary sealing members in sealing interengagement, said means connecting said shaft flange means being releasable for separating said shaft sections, and said flange means on said inner shaft section being removable from said inner shaft section for removal and replacement of said mechanical sealing means.

6. A sealed shaft construction for use with a fluid containing receptacle having an opening therein, said construction comprising rotatable shaft means having inner and outer axially aligned sections; a closure member attachable to a receptacle adjacent the opening therein and having an opening therethrough for the reception of an inner shaft section, mechanical sealing means for sealing said opening in said closure member, said sealing means comprising a first sealing ring associated with said closure member and having a finished surface, a second sealing ring on said inner shaft section for rotation therewith and having a finished surface engaging the finished surface of said first ring, means for holding said rings together with said finished surfaces in close fitting, substantially fluid-tight engagement for sealing said opening in said closure member; flange means on adjacent ends of said shaft sections outboard of said mechanical sealing means; means for securing said flange means together for joining said shaft sections; auxiliary sealing members inboard of said mechanical sealing means, one of said auxiliary sealing members being associated with said closure member, the other of said sealing members being on said shaft means and movable axially therewith; means for moving said shaft means axially to engage said auxiliary sealing members for temporarily sealing said opening in said closure member; and means for holding said auxiliary sealing members in sealing interengagement, said means connecting said shaft flange means being releasable for separating said shaft sections, and said flange means on said inner shaft section having a tapered bore engaging the tapered end of said inner shaft section and being removable therefrom for removal and replacement of said mechanical sealing means.

7. A sealed shaft construction for use with a fluid containing receptacle having an opening therein, said construction comprising rotatable shaft means having inner and outer axially aligned section; a closure member attachable to a receptacle adjacent the opening therein and having an opening therethrough for the reception of an inner shaft section; mechanical sealing means for sealing said opening in said closure member, said sealing means comprising a first sealing ring associated with said closure member and having a finished surface, a second sealing ring on said inner shaft section for rotation therewith and having a finished surface engaging the finished surface of said first ring, means for holding said rings together with said finished surfaces in close fitting, substantially fluid-tight engagement for sealing said opening in said closure member; means for separably connecting said shaft sections outboard of said mechanical sealing means; auxiliary sealing members inboard of said mechanical sealing means, one of said auxiliary sealing members being associated with said closure member, the other of said auxiliary sealing members being on said shaft means and movable axially therewith; means for moving said shaft sections axially to engage said auxiliary sealing members for temporarily sealing said opening in said closure member; gasket means interposed between opposing surfaces of said auxiliary sealing members and engaged by said members when in their sealing positions; and interengaging mating means on said axially sealing members for holding the same in sealing engagement, said inner and outer shaft sections being separable at said connecting means for removal and replacement of said mechanical sealing means.

8. A sealed shaft construction for use with a fluid containing receptacle having an opening therein, said construction comprising rotatable shaft means having inner and outer axially aligned sections; a closure member attachable to a receptacle adjacent the opening therein and having an opening therethrough for the reception of an inner shaft section; mechanical sealing means for sealing said opening in said closure member, said sealing means comprising a first sealing ring associated with said closure member and having a finished surface, a second sealing ring on said inner shaft section for rotation therewith and having a finished surface engaging the finished surface of said first ring, means for holding said rings together with said finished surfaces in close fitting, substantially fluid-tight engagement for sealing said opening in said closure member; means for separably connecting said shaft sections outboard of said mechanical sealing means; auxiliary sealing members inboard of said mechanical sealing means, one of said auxiliary sealing members being associated with said closure member, the other of said auxiliary sealing members being on said shaft means and movable axially therewith; means for moving said shaft sections axially to engage said auxiliary sealing members for temporarily sealing said opening in said closure member; gasket means interposed between opposing surfaces of said auxiliary sealing members and engaged by said sealing members when in their sealing positions, interrupted thread means on one of said auxiliary sealing members; and projecting parts on the other of said auxiliary sealing members for engaging said thread means for holding said auxiliary sealing members in sealing engagement, said shaft sections being separable at said connecting means for removal and replacement of said mechanical sealing means.

9. A sealed shaft construtcion for use with a fluid containing receptacle having an opening therein, said construction comprising rotatable shaft means having axially aligned inner, intermediate and outer sections one of which may extend through said opening, said shaft means being movable in opposed axial directions from a first position to a second position; a closure member attachable to a receptacle adjacent the opening therein and having an opening therethrough for the reception of said one of said shaft sections; mechanical sealing means for sealing said opening in said closure member, said sealing means comprising a first sealing ring associated with said closure member and having a finished surface, a second sealing ring on said one of said shaft sections for rotation therewith and having a finished surface engaging the finished surface of said first ring, means for holding said rings together with said finished surfaces in close fitting, substantially fluid-tight engagement for sealing said opening in said closure member; said inner shaft section being inboard of said mechanical sealing means; said one of said shaft sections being an intermediate shaft section and having separable means at the opposite ends thereof for connecting the same to said inner shaft section and to a shaft section located outboard of said sealing means; means for moving said shaft sections in an axial direction to said second position; and means for holding said inner shaft section in said second position thereof, said shaft sections being separable at opposite ends of said intermediate section at said connecting means for removal and replacement of said mechanical sealing means and said intermediate shaft section.

10. A sealed shaft construction for use with a fluid containing receptacle having an opening therein, said construction comprising rotatable shaft means having axially aligned inner, intermediate and outer sections one of which may extend through said opening, said shaft means being movable in opposed axial directions from a first position to a second position; a closure member attachable to a receptacle adjacent the opening therein and having an opening therethrough for the reception of said one of said shaft sections; mechanical sealing means for sealing said opening in said closure member, said sealing means comprising a first sealing ring associated with said closure member and having a finished surface, a second sealing ring on said one of said shaft sections for rotation therewith and having a finished surface engaging the finished surface of said first ring, means for holding said rings together with said finished surfaces in close fitting, substantially fluid-tight engagement for sealing said opening in said closure member; said inner shaft section being inboard of said mechanical sealing means, said one of said shaft sections being an intermediate section and having separable means at the opposite ends thereof for connecting the same to said inner shaft section and to a shaft section located outboard of said sealing means; bearing means for said intermediate shaft section mounted adjacent said mechanical sealing means; means for moving said shaft means in an axial direction to said second position; and means for holding said inner shaft section in said second position thereof, said shaft sections being separable at opposite ends of said intermediate shaft section at said connecting means for removal and replacement of said mechanical sealing means, said bearing means and said intermediate shaft section.

11. A sealed shaft construction for use with a fluid containing receptacle having an opening therein, said construction comprising rotatable shaft means having axially aligned inner, intermediate and outer sections one of which may extend through said opening, said shaft means being movable in opposed axial directions from a first position to a second position; a closure member attachable to a receptacle adjacent the opening therein and having an opening therethrough for the reception of said one of said shaft sections; mechanical sealing means for sealing said opening in said closure member, said sealing means comprising a first sealing ring detachably associated with said closure member and having a finished surface, a second sealing ring on said one of said shaft sections for rotation therewith and having a finished surface engaging the finished surface of said first ring, means for holding said rings together with said finished surfaces in close fitting, substantially fluid-tight engagement for sealing said opening in said closure member; said inner shaft section being inboard of said mechanical sealing means, said one of said shaft sections being an intermediate shaft section and having separable means at the opposite ends thereof for connecting the same to said inner shaft section and to a shaft section located outboard of said sealing means; auxiliary sealing members inboard of said mechanical sealing means, one of said sealing members being associated with said closure member, the other of said auxiliary sealing members being on said inner shaft section and movable axially therewith; means for moving said shaft sections axially to engage said auxiliary sealing members for temporarily sealing said opening in said closure member; and means for holding said auxiliary sealing members in sealing interengagement and said inner shaft section in said second position thereof; said shaft means being separable at opposite ends of said intermediate shaft section at said connecting means for removal and replacement of said mechanical sealing means and said intermediate shaft section.

12. A sealed shaft construction as specified in claim 11 in which said interengaging means for holding said auxiliary sealing members in sealing engagement comprises interrupted thread means on one of said auxiliary sealing members and projecting parts on said other auxiliary sealing member for engaging said thread means for holding said auxiliary sealing members in sealing engagement.

13. A sealed shaft construction for use with a fluid containing receptacle having an opening therein, said construction comprising rotatable shaft means having axially aligned inner, intermediate and outer sections one of which may extend through said opening, said shaft means being movable in opposed axial directions from a first position to a second position; a closure member attachable to a receptacle adjacent the opening therein and having an opening therethrough for the reception of said one of said shaft sections; mechanical sealing means for sealing said opening in said closure member, and sealing means comprising a first sealing ring detachably associated with said closure member and having a finished surface, a second sealing ring on said one of said shaft sections for rotation therewith and having a finished surface engaging the finished surface of said first ring, means for holding said rings together with said finished surfaces in close fitting, substantially fluid-tight engagement for sealing said opening in said closure member; said inner shaft section being inboard of said mechanical sealing means, said one of said shaft sections being an intermediate shaft section and having separable means at the opposite ends thereof for connecting the same to said inner shaft section and to a shaft section located outboard of said mechanical sealing means; auxiliary sealing members inboard of said mechanical sealing means, one of said sealing members being associated with said closure member, the other of said auxiliary sealing members being on said inner shaft section and movable axially therewith; means for moving said shaft sections axially to engage said auxiliary sealing members for temporarily sealing said opening in said closure member; gasket means interposed between opposing surfaces of said auxiliary sealing members and engaged by said members when in their sealing positions; and means for holding said auxiliary sealing members in sealing interengagement and said inner shaft section in said second position thereof, said shaft means being separable at the opposite ends of said intermediate shaft section at said connecting means for removal and replacement of said mechanical sealing means and said intermediate shaft section.

14. A sealed shaft construction for use with a fluid containing receptacle having an opening therein, said construction comprising rotatable shaft means having axially aligned inner, intermediate and outer sections one of which may extend through said opening, said shaft means being movable in opposed axial directions from a first position to a second position; a closure member attachable to a receptacle adjacent the opening therein and having an opening therethrough for the reception of said one of said shaft sections; mechanical sealing means for sealing said opening in said closure member, said sealing means comprising a first sealing ring detachably associated with said closure member and having a finished surface, a second sealing ring on said one of said shaft sections for rotation therewith and having a finished surface engaging the finished surface of said first ring, means for holding sail rings together with said finished surfaces in close fitting, substantially fluid-tight engagement for sealing said opening in said closure member; said inner shaft section being inboard of said mechanical sealing means, said one of said shaft sections being an intermediate shaft section and having separable means at the opposite ends thereof for connecting the same to said inner shaft section and to a shaft section located outboard of said mechanical sealing means; auxiliary sealing members inboard of said mechanical sealing means, one of said sealing members being associated with said closure member, the other of said auxiliary sealing members being on said inner shaft section and movable axially therewith; means for moving said shaft sections axially to engage said auxiliary sealing members for temporarily sealing said opening in said closure member; gasket means interposed between opposing surfaces of said auxiliary sealing members and engaged by said sealing members when in their sealing positions; and interrupted thread means on one of said auxiliary sealing members and projecting parts on the other of said auxiliary sealing members engaging said thread means for holding said auxiliary sealing members in sealing engagement; said shaft means being separable at opposite ends of said intermediate shaft section at said connecting means for removal and replacement of said mechanical sealing means and said intermediate shaft section.

15. A sealed shaft construction for use with a fluid containing receptacle having an opening therein, said construction comprising rotatable shaft means including a plurality of axially aligned sections one of which is adapted to extend through said opening, said shaft means being movable in opposed axial directions from a first position to a second position and being unsupported axially at the inner end thereof when in said first position; means for separably connecting adjacent shaft sections; a closure member attachable to a receptacle adjacent the opening therein and having an opening therethrough for the reception of said shaft means; sealing means associated with said shaft means and said closure member for sealing said opening in said closure member; and means for holding said shaft means in said second position thereof, said shaft sections being separable at said connecting means for removal and replacement of said sealing means.

16. A sealed shaft construction for use with a fluid containing receptacle having an opening therein, said construction comprising rotatable shaft means including a plurality of axially aligned sections one of which may extend through said opening, said shaft means being movable in opposed axial directions from a first position to a second position; means for separably connecting adjacent shaft sections; a closure member attachable to a receptacle adjacent the opening therein and having an opening therethrough for the reception of said shaft means; mechanical sealing means for sealing said opening in said closure member, said sealing means comprising a first sealing ring associated with said closure member and having a finished surface, a second sealing ring on one of said shaft sections for rotation therewith and having a finished surface engaging the finished surface of said first ring, means for holding said rings together with said finished surfaces in close fitting, substantially fluid-tight engagement for sealing said opening in said closure member; auxiliary sealing members inboard of said mechanical sealing means, one of said auxiliary sealing members being associated with said closure member, the other of said auxiliary sealing members being on said shaft means and movable axially therewith from said shaft first position to said shaft second position to engage said one of said auxiliary sealing members for temporarily sealing said opening in said closure member; and means for holding said shaft means in said second position thereof, said shaft sections being separable at said connecting means for removal and replacement of said mechanical sealing means.

17. A sealed shaft construction for use with a fluid containing receptacle having an opening therein, said construction comprising rotatable shaft means having axially aligned inner, intermediate and outer sections one of which may extend through said opening, said shaft means being movable in opposed axial directions from a first position to a second position; a closure member attachable to a receptacle adjacent the opening therein and having an opening therethrough for the reception of said one of said shaft sections; mechanical sealing means for sealing said opening in said closure member, said sealing means comprising a first sealing ring associated with said closure member and having a finished surface, a second sealing ring on said one of said shaft sections for rotation therewith and having a finished surface engaging the finished surface of said first ring, means for holding said rings together with said finished surfaces in close fitting substantially fluid-tight engagement for sealing said opening in said closure member; said inner shaft section being inboard of said mechanical sealing means, said one of said shaft sections being an intermediate shaft section and having separable means at the opposite ends thereof for connecting the same to said inner shaft section and to a shaft section located outboard of said sealing means; auxiliary sealing members inboard of said mechanical sealing means, one of said sealing means being associated with said closure member, the other of said auxiliary sealing members being on said inner shaft section and movable axially therewith from said shaft first position to said shaft second position to engage said one of said auxiliary sealing members for temporarily sealing said opening in said closure member; and means for holding said auxiliary sealing members in sealing engagement and said inner shaft section in said second position thereof, said shaft means being separable at said connecting means for removal and replacement of said mechanical sealing means and said intermediate shaft section.

18. A sealed shaft construction for use with a fluid containing receptacle having an opening therein, said construction comprising a rotatable shaft element extending through said opening and being movable in opposed axial directions from a first position to a second position and being unsupported axially at the inner end thereof when in said first position; driving means; means for separably connecting said driving means to said shaft element; a closure member attachable to a receptacle adjacent the opening therein and having an opening therethrough for the reception of said shaft element; mechanical sealing means for sealing said opening in said closure member, said sealing means comprising a first sealing ring associated with said closure member and having a finished surface, a second sealing ring on said shaft element for rotation therewith and having a finished surface engaging the finished surface of said first ring, means for holding said rings together with said finished surfaces in close fitting, substantially fluid-tight engagement for sealing said opening in said closure member; and means for holding said shaft element in said second position thereof, said shaft element being separable from said driving means at said connecting means for removal and replacement of said mechanical sealing means.

19. A sealed shaft construction for use with a fluid containing receptacle having an opening therein, said construction comprising rotatable shaft means having a plurality of axially aligned sections one of which may extend through said opening, said shaft sections being movable in opposed axial directions from a first position to a second position; driving means; means for separably connecting said driving means to the outboard end of said one of said shaft sections; a closure member attachable to a receptacle adjacent the opening therein and having an opening therethrough for the reception of said one of said shaft sections; mechanical sealing means for sealing said opening in said closure member; said sealing means comprising a first sealing ring detachably associated with said closure member and having a finished surface, a second sealing ring on said one of said shaft sections for rotation therewith and having a finished surface engaging the finished surface of said first ring, means for holding said rings with said finished surfaces in close-fitting, substantially fluid-tight engagement for sealing said opening in said closure member; an inner shaft section inboard of said mechanical sealing means; means for separably connecting said inner shaft section to the inboard end of said one of said shaft sections; means for holding said inner shaft section in said second position; said one of said shaft sections being separable at the opposite ends thereof at said connecting means for removal and replacement of said mechanical sealing means and said one of said shaft sections.

References Cited in the file of this patent

UNITED STATES PATENTS

| | | |
|---|---|---|
| 1,475,038 | Tunnell | Nov. 20, 1923 |
| 1,789,497 | Potter | Jan. 20, 1931 |
| 2,127,865 | Goddard | Aug. 23, 1938 |
| 2,365,146 | Wichorek | Dec. 12, 1944 |
| 2,479,711 | Arutunoff | Aug. 23, 1949 |
| 2,612,391 | Boutros | Sept. 30, 1952 |